3,374,099
ENZYME INHIBITOR FOR PREVENTING SOFTENING IN BRINED FOODS
Thomas A. Bell, John L. Etchells, and William W. G. Smart, Jr., Raleigh, N.C., assignors to the United States of America as represented by the Secretary of Agriculture
Filed Oct. 10, 1963, Ser. No. 315,416
5 Claims. (Cl. 99—156)

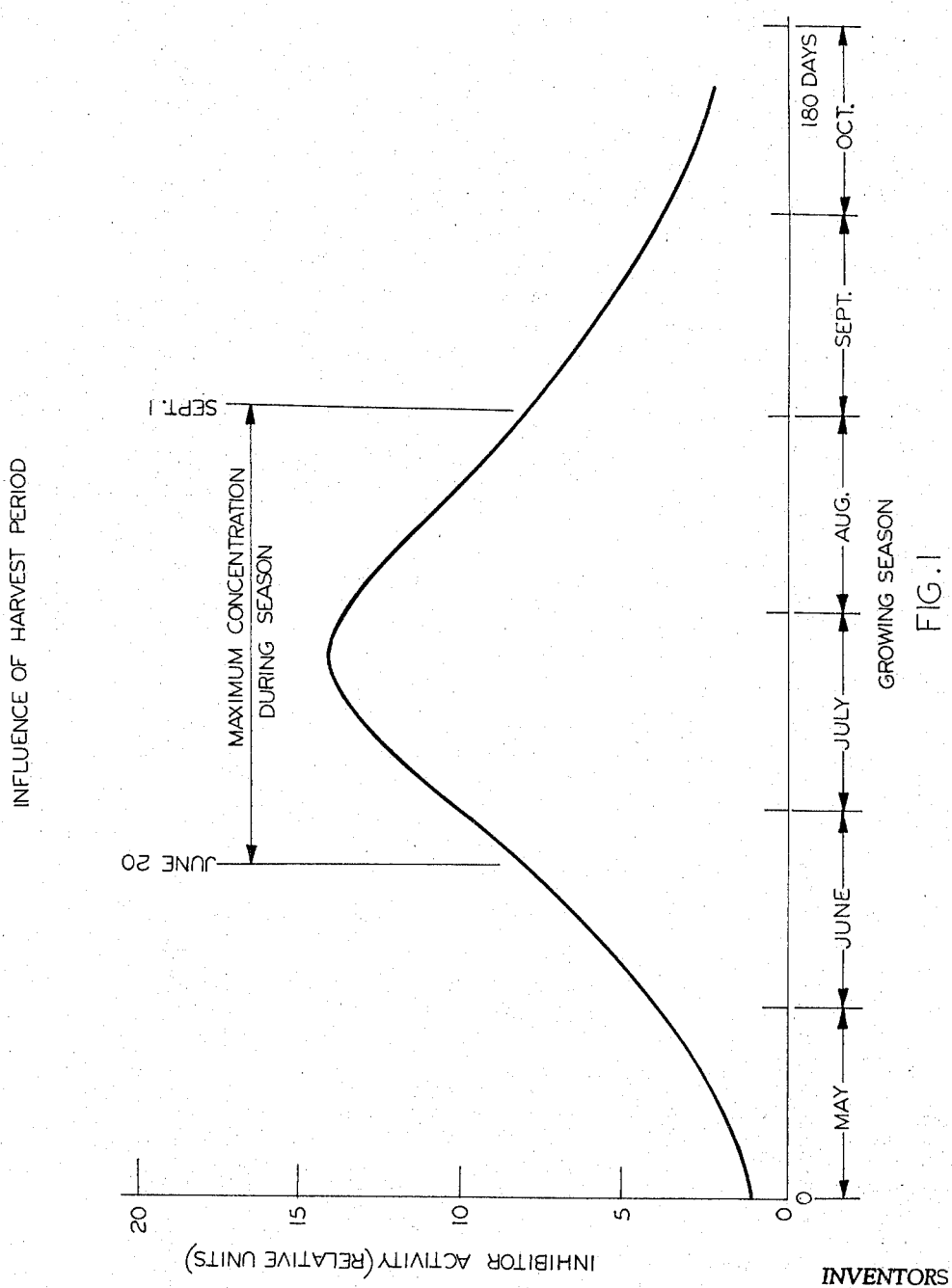

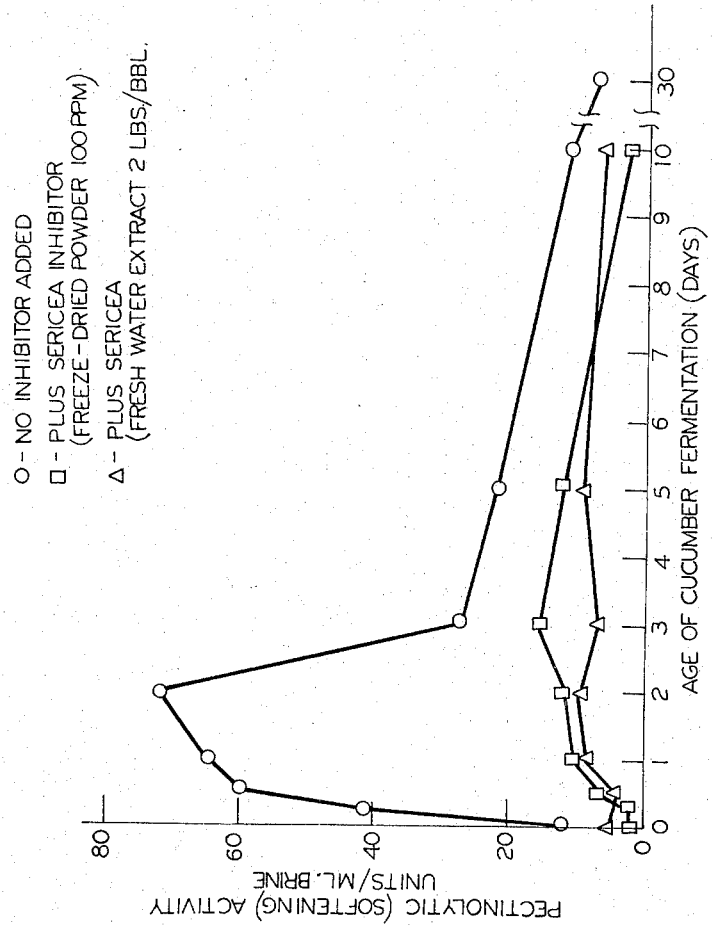

A non-exclusive, irrevocable, royalty-free license in the invention herein described, throughout the world for all purposes of the United States Government, with the power to grant sublicenses for such purposes, is hereby granted to the Government of the United States of America.

This invention has as its objective the use of an enzyme inhibiting material isolated and concentrated from the forage plant sericea (*Lespedeza cuneata*) to prevent "softening" in the brining of cucumbers and other vegetables and fruits, namely cherries, olives, onions, cauliflower, sweet and hot peppers, tomatoes, okra, green beans carrots, citron, and watermelon and cantaloupe rinds. It is known that the softening of brined cucumbers, this applies also to other vegetables and fruits being processed under commercial conditions, is caused by activity within the fleshy structure of the cucumber of certain hydrolytic enzymes such as, for example, the pectinolytic and cellulolytic enzymes. Softening occurs when the pectic substance, which functions somewhat as a cementing agent for the cells of plant tissue, is broken down. Thus, softening can be viewed as being intimately connected with a group of hydrolytic enzymes.

Pectic substances are essentially long chain polymers of D-galacturonic acid, and are connected by 1,4-glycosidic bonds. Pectin differs from pectic acid in that about 3 of every 4 residues are esterified with methanol. Pectinesterase (syn. pectase), which is one of the hydrolytic enzymes effectively inhibited by the material that is the subject of this invention, removes the methoxyl group from pectin to produce pectic acid. Polygalacturonase (commonly called pectinase), which hydrolyzes the glycosidic bonds of pectic acid, and is considered one of the primary enzyme systems for cucumber softening, is also effectively inhibited by the material that is the subject of this invention. Cellulosic substances are essentially long chain polymers of B-D-glucopyranose and are considered to be the most abundant of organic substances in plants. When these polymers are broken down by cellulase and cellulolytic enzymes, the 1,4-glucosidic bonds are split. The cellulolytic enzymes causing this reaction are also effectively inhibited by the material that is the subject of this invention.

An important source of the particular hydrolytic enzymes that are undesirable in the brining process for pickles is very likely the mold-laden cucumber flowers attached to the cucumbers (*Cucumis sativus*) being processed. The cucumber flowers are unavoidably introduced into the brining operations along with the cucumbers. The softening of cucumbers is reputed to be responsible for monetary losses to the pickle manufacturers of upwards of a million dollars annually. Other brined and salted fruits and vegetables have hydrolytic enzymes introduced through various means and they too experience softening spoilage.

It is known that certain plants contain naturally occurring substances and that extracts thereof function as inhibitors for hydrolytic enzymes such as the pectinolytic and cellulolytic enzymes. An impressive list of plants, whose parts (generally the leaves) contain a material that acts as an enzyme inhibitor for the pectinolytic and cellulolytic enzymes, has been collected. The leaves of grape, persimmon, dogwood, blueberry, sericea, blackberry, raspberry, and rose are presently considered fairly good sources for hydrolytic enzyme inhibiting substances.

We have now discovered that the forage plant sericea (*Lespedeza cuneata*) is, under certain quite special conditions, not only an excellent source of a material that acts as an enzyme inhibitor for pectinolytic and cellulolytic enzymes, but further we have discovered that when this enzyme inhibiting material is water extracted and/or suitably concentrated from the forage plant sericea, it may be used to advantage in the fermentation operations attendant to the production of brine cured cucumbers. We have also discovered that the presence of the enzyme inhibiting material in sericea is seasonal and limited to about a 10-week period within the growing season. Perhaps even more surprising and unexpected than the circumscribed seasonal occurrence of the hydrolytic enzyme inhibitor in sericea, is our discovery that during the period when the inhibiting material is present in sericea, it (the inhibiting material) is extremely unstable. If special precautions and the exercise of particular techniques for harvesting the plant are not adhered to, the enzyme inhibiting material will quickly disappear entirely from the leaves of the harvested plant.

The graph (FIGURE 1) illustrates how critical the harvest time is for sericea, when the stalks and leaves thereof are to be utilized for the extraction of an enzyme inhibiting material. The data from which the graph (FIGURE 1) was constructed shows that the optimum harvest period for yield of enzyme inhibitor extends from mid-June to the first of September with peak concentration occurring during the latter part of July. Sericea grown in different localities may well exhibit a slightly different optimum harvest period. Furthermore, an altered optimum harvest period might also result from abnormal growing conditions (i.e., plants raised in an artificial environment). However, using well-known techniques to establish the presence of and measure the potency of the enzyme inhibitor, it is a simple matter to check, periodically, for presence of and for the concentration of the inhibitor. Thus, optimum harvest time for any particular set of growing conditions can easily be determined.

We establish the presence and potency of the enzyme inhibitor in plant materials, by use of the following procedure: approximately 20 grams of shredded plant material is macerated in a laboratory blender together with 400 ml. of distilled water. The blending is carried out for a period of 3 minutes following which period of time the resultant slurry is pressed through several layers of cheesecloth. The so strained extract is then clarified by centrifugation for 15 minutes at 3000 r.p.m. The supernatant liquid from the extracted, strained, and centrifuged material is employed for the enzyme inhibitor tests. Commercial enzymes, pectinase and cellulase, are available and are useful for testing inhibitor potency.

*Enzyme solution.*—A new enzyme solution must be prepared each day as described below. A weighed sample (.100 g.) of a commercial pectinase was made up to 100 ml. with water. An aliquot of this solution was diluted to a concentration of 0.1 mg./100 ml.

*Crude enzyme (pectinase and cellulase) preparation.*—A crude enzyme solution can be prepared from cucumber flowers, preferably from the early season's cucumbers. The solution was prepared by blending 20 g. of flowers with 400 ml. of 2% NaCl solution for a period of 3 minutes. The mixture was filtered, and the filtered extract was dialyzed for 3 hours in cellophane tubing against tap water followed by 1 hour against distilled water. The clear, crude solution from cucumber flowers can be used for pectinase and cellulase and can be preserved by storage at 40° C. with a few drops of toluene.

*Enzyme substrates.*—For pectinase enzyme, 6 grams of sodium polypectate (SP) was dissolved in 500 ml. of 0.02 M NaOH-citric acid buffer at pH 5.0 and 55° C. by mixing in a laboratory blender. The resulting solution was filtered through several layers of cheesecloth and preserved using 1 ml. of toluene. For cellulase enzyme, a 1.2% sodium carboxymethylcellulose (CMC–70 M) solution in sodium hydroxide-citric acid buffer solution at pH 5.0 was used. This solution was prepared in the same manner as the sodium polypectate solution, except 6.0 grams of CMC were used in place of the 6.0 grams of SP.

*Measuring enzyme and inhibitor activity.*—The viscometric method was employed and measurements were taken after a reaction time of 1, 2, and 20 hours. Using 100 units of pectinase activity as equivalent to a 50% viscosity loss in 20 hours of reaction time, a table was set up relating loss in viscosity to units of pectinase activity. This table was calculated from a curve relating the log of pectinase activity units to the percent loss in viscosity. The same general procedure as outlined above for the pectinolytic test is followed for the cellulolytic enzyme test, except that a 1.2% solution of sodium carboxymethylcellulose (CMC) is substituted for the pectate (SP) solution. Standard enzyme activity (control) was measured by mixing enzyme solution with water (2:1 v./v.) and using 1 ml. of this mixture added to 5 ml. of substrate at 30° C. in an Ostwald-Fenske viscosity pipette (uncalibrated, No. 300). Inhibitor activity was measured by substituting one volume of the inhibitor solution prepared as described above for the water. The enzyme and inhibitor were mixed at least 15 minutes before the viscosity measurement was started. Correction was made for the flow time for pure water for each pipette.

As noted earlier, certain precautions must be exercised during the harvest of sericea if the leaves and stems are to be used as a source of enzyme inhibiting material. The sericea leaves, during the harvesting and subsequent storage and before extraction of the inhibitor material, must not be bruised, crushed, or in any way injured until such time as they (the leaves) are being prepared for extraction at the outset of the process for isolating and concentrating the inhibitor material. We have discovered, for example, that sericea cut during the optimum harvest period as for conventional harvest and processing will lose appreciable amounts of the potency of its enzyme inhibitor material in a matter of 15 to 20 minutes and in any event we have found that 6 hours is about the upper limit of holding time for harvested sericea if processing for the extraction of enzyme inhibitor material is contemplated. Furthermore, the leaves of sericea subjected to conventional forage crop harvest methods together with hauling after harvest to a processing center, will upon arrival at the last named location, be devoid, or have only small traces, of the enzyme inhibitor material. We have, therefore, found it essential at the appropriate harvest time, to cut the sericea stalks immediately above the ground, exercising care not to injure the leaves in any manner whatsoever, forthwith to place the stalks and attached leaves in a plastic bag. Placing the plastic bag and contents in cold storage with Dry Ice until such time as the harvested stalks and leaves can be removed from the growing area did not cause the inhibitor to be appreciably retained in the plant material. However, refrigerated storage at 0° F. and below of stalks and leaves sealed in plastic bags can extend enzyme inhibitor potency for several months without significant loss.

The data summarized in Table I clearly reflect importance of harvest and storage methods if the forage plant leaves are ultimately to be extracted for inhibitor ingredient.

Isolation of the enzyme inhibitor material from sericea is accomplished by simple water extraction of the leaves and stems (ethanol and methanol are equally operable as extractants). Following extraction of the inhibitor material from the leaves, the active principle is complexed and precipitated with an aqueous solution of caffeine and the caffeine complexed material physically separated from the aqueous media and any water soluble extraneous material. The caffeine-inhibitor complex is slightly soluble in water and also exhibits properties of inhibiting hydrolytic enzymes; however, for best results the caffeine should be removed. The caffeine complexed active principle is thereupon resuspended in water and separated from its caffeine complex by liquid-liquid extraction using a water immiscible solvent (ether and chloroform are each operable) after which the extraction separated active principle (in the aqueous layer) is concentrated and subsequently freeze dried.

The enzyme inhibitor material which is the subject of this invention is characterized chemically into a class of compounds called "Leucoanthocyanidins." The isolated inhibitor substance is further classified under the more general term "Flavonoids" and differs in molecular structure from the many flavonoid derivatives by the flavan-3, 4-diol structure. The hydrolytic enzyme inhibitor, isolated from sericea, is a light, almost colorless powder which is very soluble in water, methanol, ethanol, and propanol, and is insoluble in ethyl acetate, acetone, benzene, ether, chloroform, acetic acid and strong mineral acids. We would point out, however, that when sericea is harvested for feed purposes by conventional means, cut mechanically or chopped for dehydration as contrasted with our particular prescribed harvest methods, the inhibitor activity disappears almost completely although the sericea still exhibits a positive test for the presence of tannins. Thus, the tannin content of sericea does not necessarily correlate with content of the inhibitor that is the subject of this invention.

The following example illustrates one method for isolating and concentrating the enzyme inhibiting material:

A 250-gram quantity of fresh sericea leaves harvested at the appropriate time and with the exercise of the prescribed precautions as noted above, or alternatively, 250 grams of sericea leaves harvested and stored under refrigeration in plastic bags as described above, was blended together with 2 liters of distilled water for a period of three minutes in a one-gallon capacity laboratory blender. The resulting slurry was filtered through a large Buchner funnel using several thicknesses of cheesecloth as the filter medium. The above steps of blending and filtering were repeated ten times so that ultimately a total of 2500 grams of sericea leaves was extracted with the result that 18 liters of filtered sericea leaf extract was obtained. The filtered leaf extract was centrifuged to remove suspended plant materials, the clarified solution cooled to 15° C. and again centrifuged. To this twice centrifuged 15° C. leaf extract 6 liters of cooled (10 to 12° C.) caffeine solution (15 g./l.) were added slowly and with constant stirring. The mixture of leaf extract and caffeine solution was then cooled and held at a temperature of from 8 to 10° C. until precipitation of the complex was complete. The caffeine inhibitor complex was allowed to settle for approximately 4 hours but the complex can be held in water suspension overnight at 15° C. The supernatant liquor, after the complex had settled, was then centrifuged to remove additional quantities of the suspending liquor. The complexed material can be utilized as such as a hydrolytic enzyme inhibiting material, or may be freeze-dried for use later. Following centrifugation, the caffeine complex was resuspended in approximately 2 liters of water and the complex in suspension then subjected to liquid-liquid extraction with chloroform (diethyl ether is equally operable) for a period of 20 hours. Following extraction, the water layer was removed from the extractor, filtered through paper, and placed in a vacuum evaporator where the total volume was reduced by approximately ½ (water bath temperature about 50° C.). The reduced volume of inhibitor solution was then divided into two equal portions, each portion placed in a 2-liter round bottom flask, and both subjected to freeze drying. The resulting freeze dried inhibitor material was light gray in color, extremely fluffy and light. The yield of inhibitor material from 2,500 grams of sericea leaves was approximately 40 grams. The resultant inhibitor material exhibited almost complete solubility in water and 1 mg./ml. concentration with water exhibited enzyme (pectinase and cellulase) inhibiting values of greater than 50%, respectively. The yield of isolated and concentrated enzyme inhibitor material from 2 pounds of sericea leaves will vary from about ¼ to 2 ounces.

The inhibitor is quite stable. Measurements, by the viscometric method, on water extracts stored in a refrigerator for 1½ months still gave inhibitions of 98–100% at low dilutions. Solutions of the isolated and of redissolved freeze-dried inhibitor material, stored in a refrigerator for one month, also gave 100% inhibition.

The purpose of brining is to preserve cucumbers until the packer is ready to manufacture the various types of pickle products. Brining is a necessity, since the cucumber-growing season lasts only a few weeks, but the pickle packing plants operate throughout the year. We estimate that currently one-third of the annual crop is packed fresh and pasteurized, while the remainder is brined.

There are many different salting procedures; however, most of the current procedures are based on the same principle. Large wooden vats containing a few inches of brine are filled with fresh cucumbers and then covered with "false-head" made from wooden boards to prevent them from floating above the brine surface. Next, salt brine of sufficient strength is added to give a final salt concentration of 5 to 10%, after equilibrium between the cucumbers and the brine. Periodically, salinity is determined and dry salt is added, according to the individual procedure. After about 5 weeks, the salt concentration has been increased to about 16% and is held at this strength until the pickles are used. Some packers add dry salt to the cucumbers while filling the tank, and add brine after the covering boards are put in place.

We prefer to utilize our isolated and concentrated inhibitor material in conventional pickle brining operations in amounts ranging from 50 to 100 p.p.m. based on the weight of the brine and vegetable material. However, quantities as small as 5 to 10 p.p.m. exhibit enzyme inhibiting effect. The use of quantities greater than 100 p.p.m. is without purpose. We recommend that the inhibitor be employed in the first brining operation and in any event employed during the first 48 hours of the brining operation.

Application of the inhibitor early in the brining operation insures maximum benefit with respect to the prevention of softening and in addition allows the processor to avoid the multiple draining operations typically resorted to in commercial brining operations for the purpose of ridding the cucumbers undergoing brining of the softening factor. Multiple draining operations are most undesirable from the point of view of waste disposal and attendant pollution problems besides being wasteful of salt. A graphic representation (FIGURE 2) is presented showing the effects achieved by virtue of the addition of the hydrolytic enzyme inhibitor to cucumber fermentations and the very low levels of pectinolytic enzyme activity as compared to the higher level enzyme activity for the control (no inhibitor added). As indicated in FIGURE 2, a water extract of fresh sericea and a 100 p.p.m. of the freeze dried powder were equally effective in reducing the softening enzymes (the results for cellulolytic activity gave similar and marked reduction in activity when the inhibitor was added). The freeze-dried powder employed in the above experiment was prepared according to the directions set forth above and was added at the very outset of the brining operation.

Pectinolytic and cellulolytic enzyme activities of the brine samples were measured by the viscometric method. In this procedure, 100 units of pectinolytic activity equal 50% loss in viscosity in 20 hours of 1.0% sodium polypectate solution in a citrate buffer at pH 5.0, at 30° C. The cellulolytic activity units are established under similar conditions except 1.0% sodium carboxymethylcellulose is used as the substrate.

The following procedure was employed for each brine sample tested. The viscosity pipette was suspended in a 30° water bath and 5 ml. of pectate solution prepared as previously described was measured into the pipette. After allowing about 10 minutes for the pectate solution to reach the water bath temperature, 1 ml. of the sample was added to the pipette. The sample and the pectate solution were mixed and the viscosity measurement started. The flow time for each viscosity pipette sample should be made at initial, 20-hour and 44-hour periods. If the sample is extremely active (loss of 50% viscosity at the 20-hour period), then it is not necessary to make further readings.

The periods for testing the brines will vary to some extent for different brining areas of the country as well as for different plant procedures for brining. Both the pectinolytic and the cellulolytic tests are helpful. If time does not permit making both tests, then the pectinolytic enzyme test should be the one followed. The first test (1–4 days) is very important because it gives an early forecast of the pectinolytic and celluloytic activities brought into the vat on the cucumbers and other materials. The results of early enzyme activities may be 4 or 5 times greater than those of later tests.

We have tested several hundred commercial and experimental brine samples obtained from the major cucumber brining areas of the country and there has been a very good correlation between positive pectinolytic activity of the brines and the soft texture of the salt-stock cucumbers from such brines. It is our experience that the USDA Fruit Pressure Tester is a very reliable instrument for measuring salt-stock firmness. It is much more sensitive than the hand for detecting losses in firmness, particularly in the range of 20 to 30%. Salt-stock may have lost as much as 50% of its firmness before it is readily detected by hand.

It is apparent from FIGURE 2 that a water extract of sericea leaves is operable, and under certain conditions the fresh or frozen (1.5 to 6 oz. per bu. cucumbers) sericea may be used directly into the brine fermentations. The freeze-dried powder would have far more advantages in use due to its stability and ease of handling.

The salt-stock cured with benefit of inhibitor was judged by personnel of the pickle company for color and acceptability for commercial use and rated good to excellent. Later, the stock was manufactured into sweet pickles and processed dill pickles. These were judged for appearance, flavor, texture, and overall acceptability and the final processed products were again rated good to excellent.

The amount of inhibitor that might possibly be carried over from brining and desalting operations into the ultimate consumer product is inconceivably small. We have carried out certain animal feeding experiments for the purpose of establishing to some degree the non-toxic nature of the inhibitor. The results of a rabbit feeding experiment wherein amounts of the isolated and concentrated inhibitor that is the subject of this invention were incorporated into a stock diet for a period of six weeks are summarized in Table II. Weight gains, even at the highest level of inhibitor employed, were better than the controls and no untoward effects were noted in the experimental animals autopsied at completion of the feeding experiment.

The utility of the isolated and concentrated inhibitor material which is the subject of this invention is potentially far wider than merely preventing the softening of cucumber pickles and other pickle products during brining. As will be recognized by those skilled in the art, such an inhibitor might be useful as a means for the control of plant viruses (tobacco mosaic, for example) as an antimetabolite, in pesticide applications, as an additive or a treatment for cellulosic textiles to prevent rot, and as a means of stabilizing the "cloud" in citrus juice. The inhibitor material will, in fact, have utility for most applications wherein the inhibition of hydrolytic enzymes (the prevention of degradation in pectin and cellulose containing materials) is important.

TABLE I.—INFLUENCE OF HARVESTING METHODS AND DEHYDRATION ON STABILITY OF THE ENZYME INHIBITOR IN SRICEA FORAGE

| Methods [1] of Sampling Sericea for Enzyme Inhibitor | Time After Chopping (minutes) | Pectinase Inhibition [2] (percent) | Cellulase Inhibition [2] (percent) | Stability of Inhibitor Activity in Sample |
|---|---|---|---|---|
| Whole stalk cut 6-8" from ground with sickle. | | 93 | 83 | Stable. |
| Mechanical Forage Cutter (chopped fairly fine). | 5-10 | 36 | 14 | Activity Lost Rapidly. |
| | 60 | 19 | 10 | |
| | 105 | 17 | 5 | |
| Chopped and Dehydrated | 115 | 3 | 7 | Activity Almost Completely Lost. |

[1] Duplicate samples were returned to the laboratory in plastic bags, one set at air-temperature (about 85° F.) and a second set frozen with Dry Ice at time of sampling. The frozen samples with Dry Ice did not appreciably stop the loss of inhibitor with the mechanical forage cutter and dehydration process. The freezing of the whole stalk with Dry Ice did not give higher inhibitor levels over duplicate sample not immediately frozen. However for long storage periods (several months) freezing of the forage is necessary.
[2] Enzyme source, 5% extract of cucumber flowers (see text).

TABLE II.—INFLUENCE OF THE INHIBITOR ON GROWTH OF IMMATURE RABBITS

| Inhibitor added to stock diet, percent: | Weight gain for 6-week period [1], grams |
|---|---|
| 0.0 | 369 |
| 0.5 | 403 |
| 1.0 | 419 |
| 2.0 | 393 |

[1] Average for 3 animals.

We claim:

1. A process for preparing an aqueous medium containing the hydrolytic enzyme inhibitor material from leaves of the plant sericea (*Lespedeza cuneata*) comprising: harvesting the leaves of said plant which contain the hydrolytic enzyme inhibitor material during the period from about June 15 to Sept. 1 by cutting the leaf carrying stalks of said plant immediately above the ground while exercising care to avoid injury to the leaves associated with the so cut stalks, and extracting the hydrolytic enzyme inhibitor material from the harvested leaves with water at about room temperature within about 6 hours after said harvest.

2. A process for preparing a moisture free concentrate of the hydrolytic enzyme inhibitor contained in the leaves of the plant sericea (*Lespedeza cuneata*) comprising:
   (a) harvesting the leaves of the said plant which contain the hydrolytic enzyme inhibitor material, during the period from about June 15 to Sept. 1 by cutting the leaf carrying stalks of said plant immediately above the ground while exercising care to avoid injury to the leaves associated with the so cut stalks,
   (b) extracting the harvested leaves with water at about room temperature within about 6 hours after said harvest,
   (c) complexing the resulting water extract of the harvested leaves with an aqueous solution of caffeine to form a substantially water insoluble caffeine-inhibitor complex in aqueous suspension,
   (d) separating the substantially water insoluble caffeine-inhibitor complex from the aqueous suspension,
   (e) resuspending the separated caffeine-inhibitor complex in water to form a slurry,
   (f) decomposing the caffeine-inhibitor complex in the water slurry by means of liquid-liquid extraction using a water immiscible solvent,
   (g) separating the aqueous phase following the liquid-liquid extraction step of (f), which contains the enzyme inhibitor material, and
   (h) freeze-drying the aqueous phase from step (g) to produce a moisture-free concentrate of the enzyme inhibitor material.

3. The process of claim 2 wherein the water immiscible solvent is chloroform.

4. A brining process for cucumber pickles which comprises mixing with the brine in the first brining operation and in any case prior to the elapse of 48 hours from inception of the brining operation from 5 to 100 parts per million, based on the weight of cucumbers and brine, of the separated caffeine-inhibitor complex of claim 2.

5. A brining process for cucumber pickles which comprises mixing with the brine in the first brining operation and in any case prior to the elapse of 48 hours from inception of the brining operation from 5 to 100 p.p.m., based on the weight of cucumbers and brine, of the moisture-free concentrate of enzyme inhibitor material of claim 2.

References Cited

Bell et al., "Inhibition of Pectinase and Cellulase by Certain Plants," Botanical Gazette, vol. 123, March 1962, No. 3, pp. 220–223.

Schwartz et al., "Isolation and Description of the Pectinase Inhibiting Tannins of Grape Leaves," Journal of Food Science, July–August 1962, vol. 27, No. 4, pp. 416–418.

A. LOUIS MONACELL, *Primary Examiner.*

M. VOET, *Assistant Examiner.*